Sept. 21, 1965 W. R. HILKER ETAL 3,206,897
FOLDING STRUCTURE FABRICATED OF RIGID PANELS
Filed June 24, 1963 5 Sheets-Sheet 1
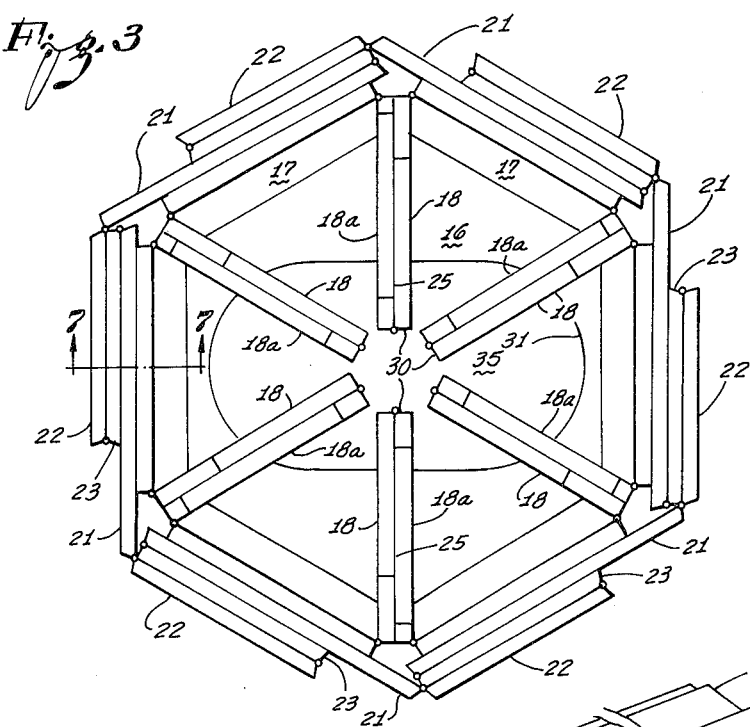
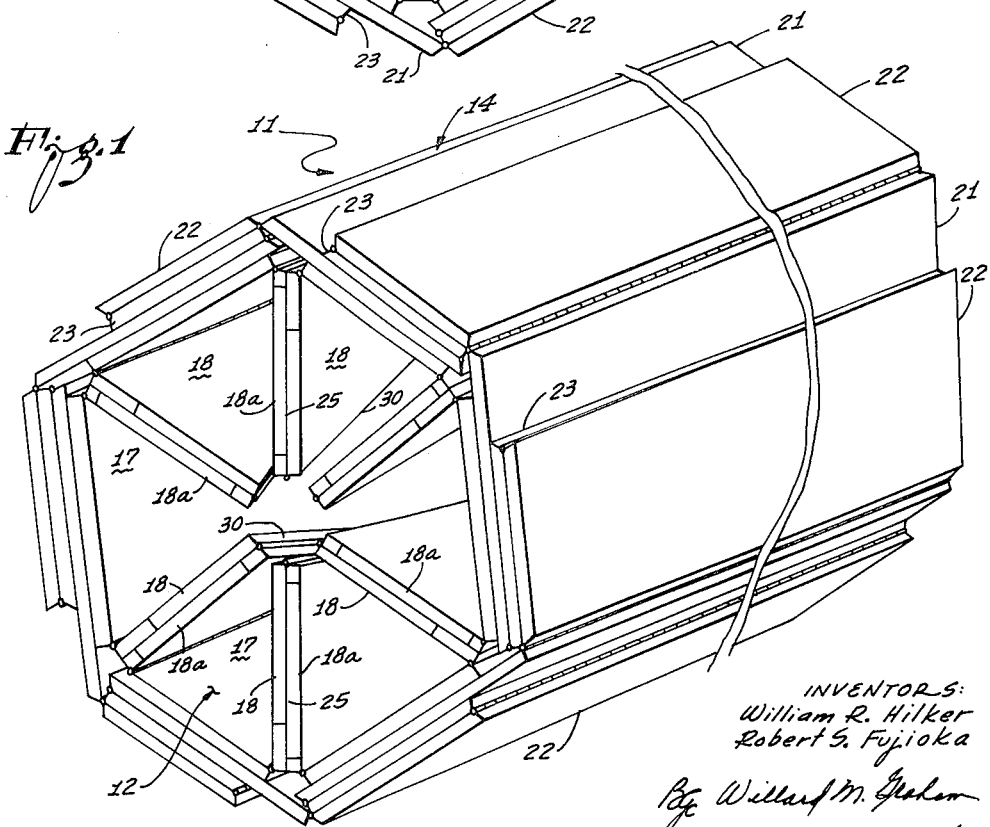
INVENTORS:
William R. Hilker
Robert S. Fujioka
By Willard M. Graham
Agent

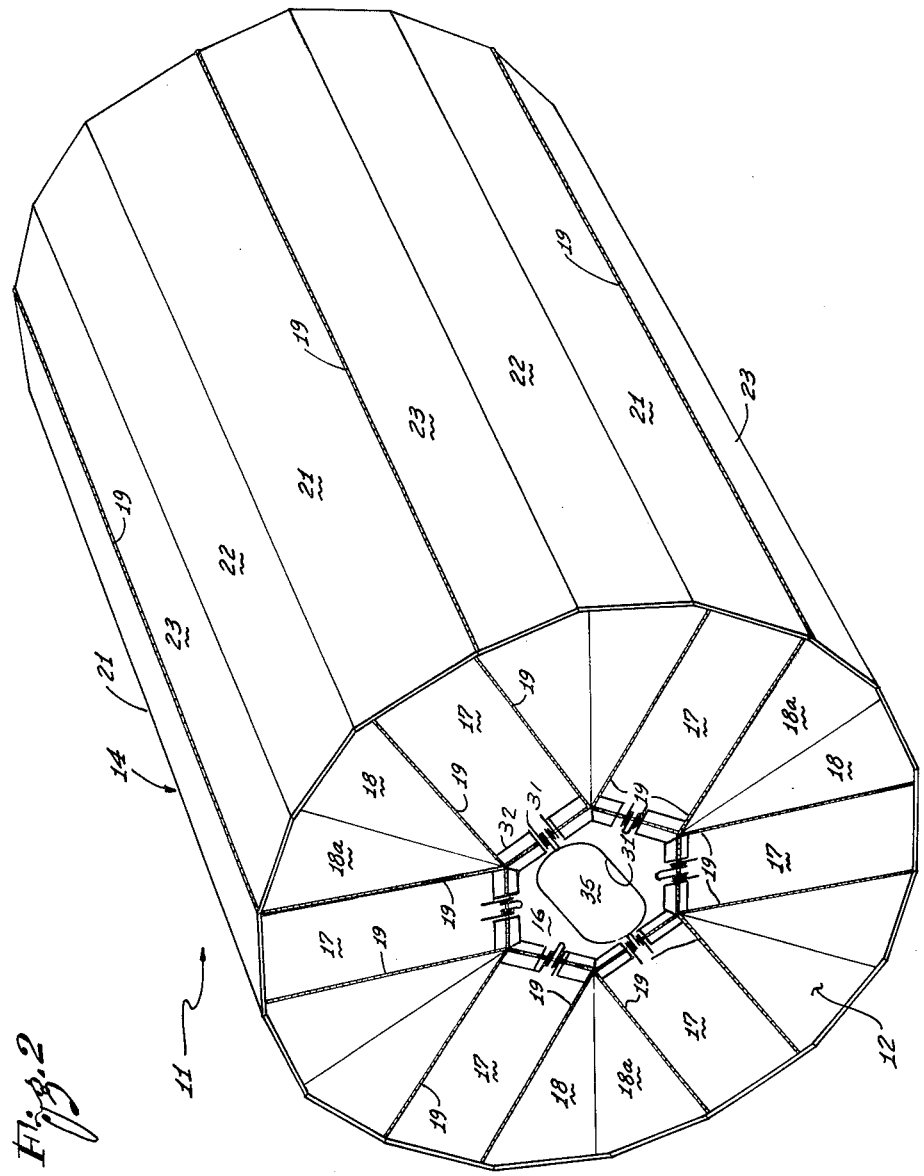

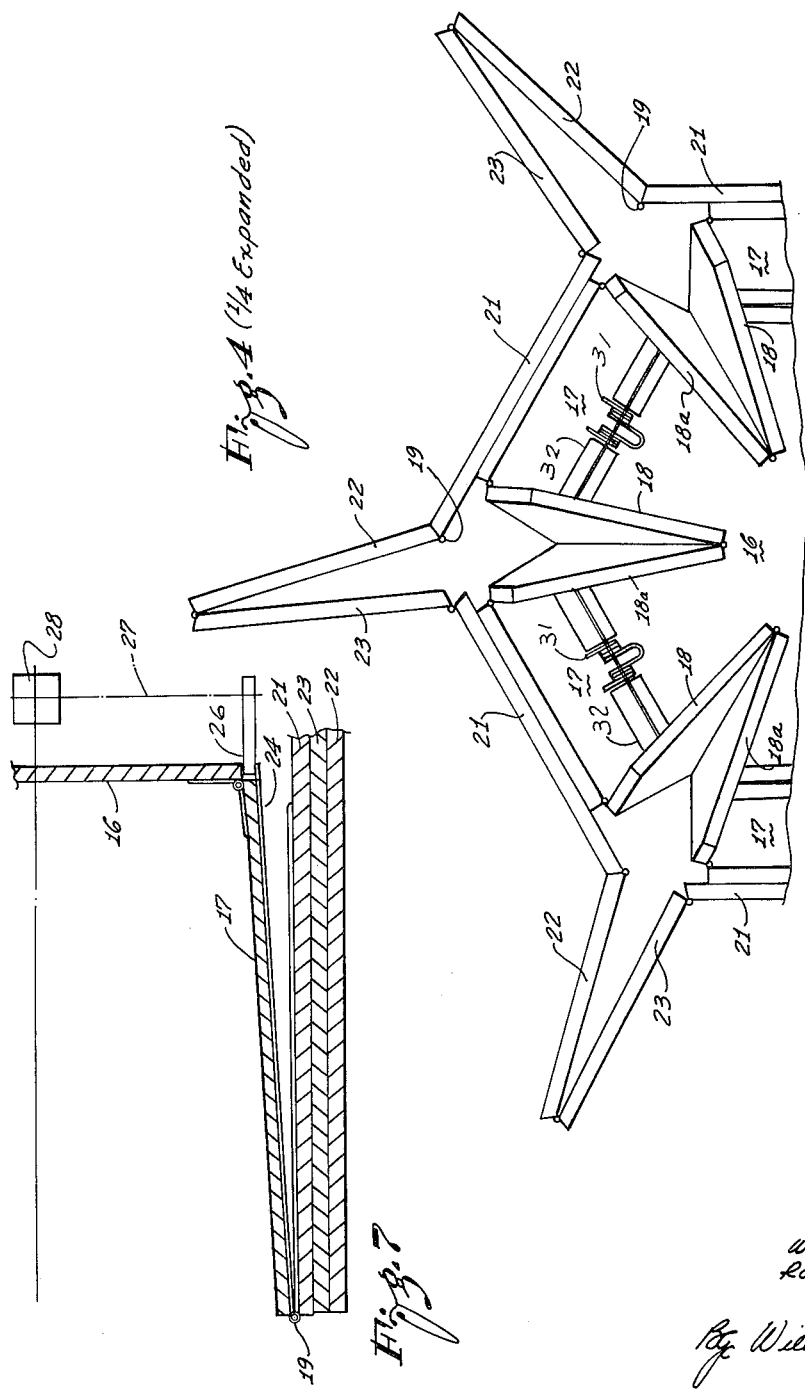

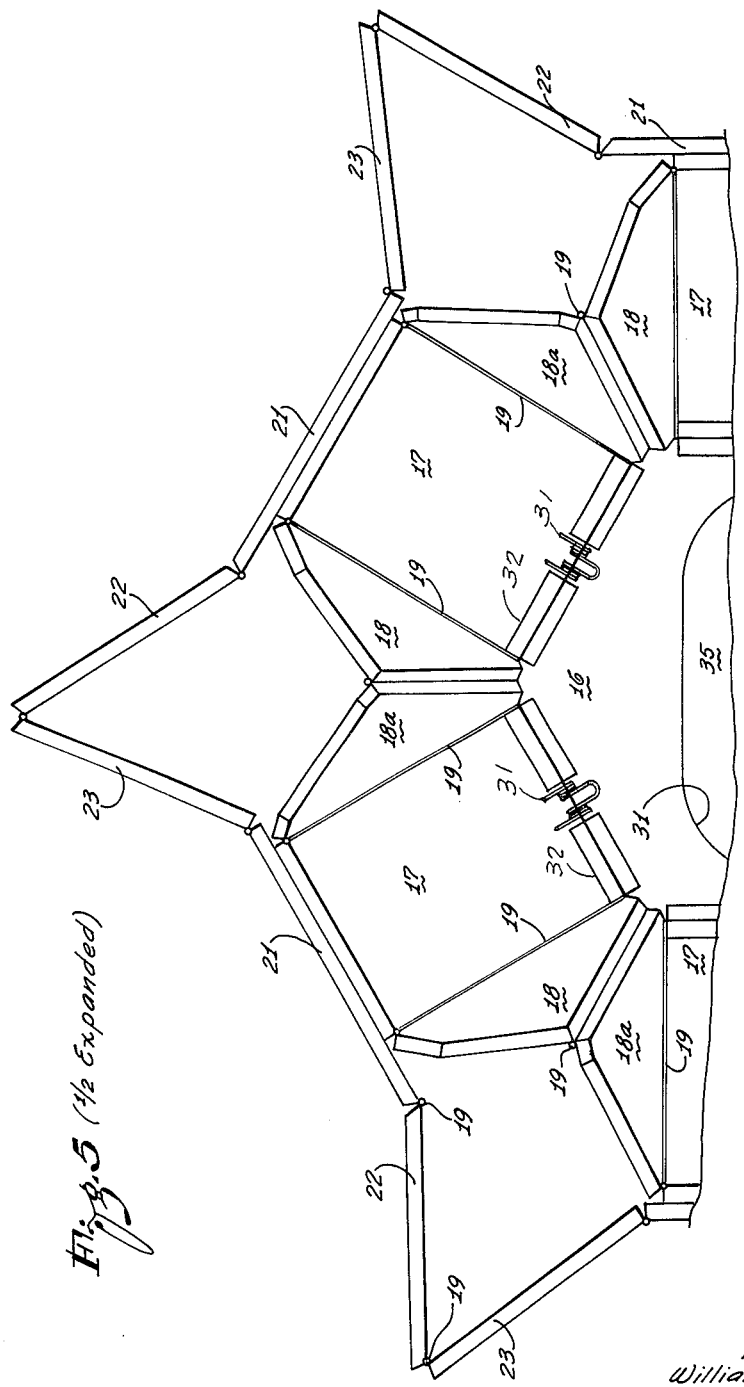

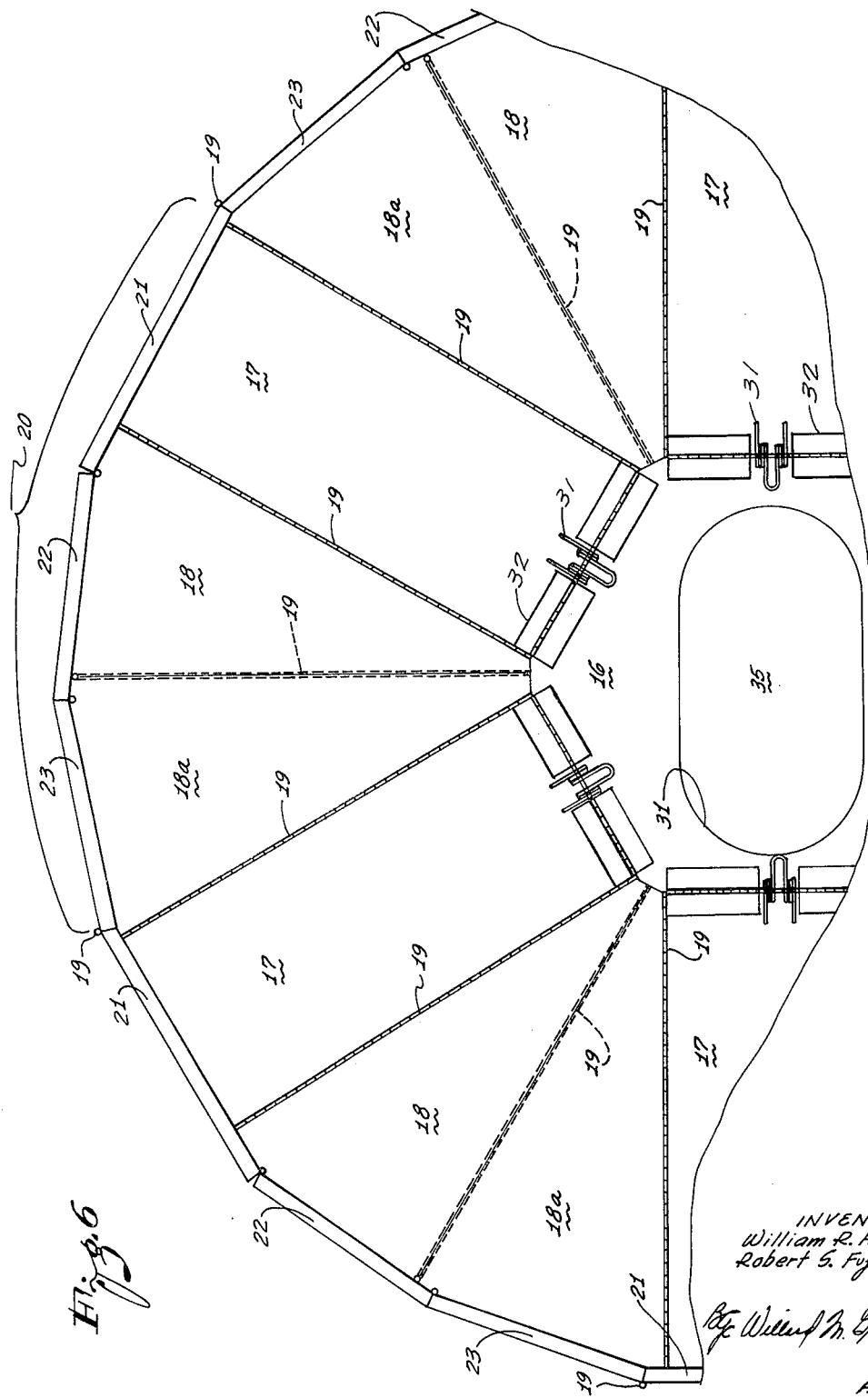

United States Patent Office 3,206,897
Patented Sept. 21, 1965

3,206,897
FOLDING STRUCTURE FABRICATED OF RIGID PANELS
William R. Hilker, Manhattan Beach, and Robert S. Fujioka, Torrance, Calif., assignors to Northrop Corporation, Beverly Hills, Calif., a corporation of California
Filed June 24, 1963, Ser. No. 290,043
9 Claims. (Cl. 52—71)

The invention described herein was made in the performance of work under an NASA contract and is subject to the provisions of Section 305 of the National Aeronautics and Space Act of 1958, Public Law 85-568 (72 Stat. 435; 42 U.S.C. 2451).

This invention pertains to expandable enclosures and more particularly to an expandable structure comprising a plurality of rigid panels constructed in a manner enabling the structure to be mechanically actuated between unexpanded and expanded states.

Primarily the structure disclosed herein is especially adapted for use in space exploration, specifically it is designed to provide a rigid protective enclosure for personnel and/or supplies in space. Inasmuch as the subject structure is expandable and fabricated of rigid panels it inherently provides many qualities that are desired and in fact required in space structures.

The instant structure is fabricated of a plurality of rigid panels of predetermined shape secured together by hinge members in a predetermined manner. Constructed in this manner, actuation of certain of the panels results in conversion of the structure from an unexpanded to an expanded state, the structure embracing a relative large volume in its expanded state as compared to the volume embraced thereby when unexpanded. Additional advantages are forthcoming as a result of and during the aforementioned conversion, these advantages will become apparent as the disclosure progresses.

An object of the present invention is to provide a structure fabricated of rigid panels adapted to be converted between expanded and unexpanded states.

Another object is to provide a structure having expanded and unexpanded states in which the volume embraced by the structure in its expanded state, with respect to volume embraced thereby in its unexpanded state, is relatively large.

Another object is to provide a rigid structure having expanded and unexpanded states, which presents a relatively small frontal area in its unexpanded state as compared to the frontal area presented in its expanded state.

Although the characteristic features of the present invention are particularly pointed out in the appended claims, the invention itself, also the manner in which it may be carried out, will be better understood by referring to the following description taken in connection with the accompanying drawings forming a part of this application and in which:

FIGURES 1 and 2 are perspective views of the structure disclosed herein in its unexpanded and expanded states, respectively.

FIGURES 3, 4, 5 and 6 are end views showing progressively the states through which the structure of FIGURE 1 progresses during the transition thereof from its unexpanded to its fully expanded state.

FIGURE 7 is an enlarged sectional fragmentary view of the structure shown in FIGURE 3, the section being viewed along the line 7—7 of the latter figure and having certain components thereof schematically shown.

Referring to the drawings, here a preferred embodiment of the structure disclosed herein, identified in its entirety by the numeral 11, is shown in its expanded and unexpanded states in FIGURES 2 and 1, respectively. The overall shape of the structure 11, both in its expanded and unexpanded states, is that of a right regular polygonal prism.

Although the preferred embodiment (structure) shown herein has eighteen (18) individual sides (FIGURE 2) and six (6) sides when in its unexpanded state (FIGURE 1), the principles involved are equally applicable to all structures having X-number of sides when unexpanded and three "X" (3·X) number of sides when expanded. The foregoing statement is true in all cases where the number of individual sides X (unexpanded state) is three (3) or greater.

The structure 11 includes end and side walls 12 and 14, respectively, fabricated of rigid panels. The individual panels, comprising the structure 11, may be fabricated of metallic or non-metallic material and may be of either solid or built-up construction.

Referring to FIGURE 2, the end walls 12 are of right and left hand construction—otherwise they are identical, accordingly a description of one will be applicable to the other. In the embodiment shown each end wall includes a central panel 16 of hexagonal configuration. The end walls also include a plurality of panels 17 of rectangular configuration and a plurality of panels 18 and 18a each constituting an isosceles triangle or substantially so. The panels 16, 17, 18 and 18a are secured together in abutting relation by means of hinge members 19. As assembled the panels 16, 17, 18 and 18a have a coplanar relation at such times as they are caused to assume their unfolded positions as best seen in FIGURES 2 and 6. The members 19 constitute piano-type hinges allowing relative angular movement between the panels allowing them to fold in a manner presently explained. One of the short edges of the panels 17 is secured to each edge of the panel 16 and extends radially therefrom. Corresponding long legs of the triangularly shaped panels 18 and 18a are hinged together and their other long legs are hinged to the longitudinally extending edges of the panels 17. As assembled, the panels 16, 17, 18 and 18a in their unfolded relation are shown in FIGURE 6.

The side wall 14 is considered to consist of a plurality of subassemblies 20 each including a primary panel 21 and two secondary panels 22 and 23. Panels constituting the subassemblies 20 are secured together along longitudinal edges thereof by means of the hinge members 19 allowing relative angular movement therebetween. The respective end edges of the panels 21 are pivotally secured to the free edges of the panels 17 also by means of members 19.

It will be seen that the panels 21 do not have a symmetrical relation with respect to the panels 17 to which they are secured. In this respect it will be seen, by referring to FIGURES 2-6, that the panels 21 extend a greater distance on one side of the panels 17 than the other. This feature enables the panels 22 and 23 to fold in the manner shown in FIGURES 1 and 3.

Assuming all to be of equal thickness, the panels 21 extend, in a clockwise sense as viewed in FIGURES 2-6, a distance of at least $7t/\sqrt{3}$ on the aforementioned sides of panels 17. The panels 21 extend a shorter distance on the other side of panel 17, the distance expressed in terms of panel thickness being at least $t/\sqrt{3}$. The panels 18 and 18a are of equal thickness, their side edges having different angular relations with their respective sides for obvious reasons.

The panels 17 and 21 must have an unsymmetrical relationship if they are to fold in the manner shown in FIGURE 3, also it will be seen that the panels 18 and 18a have a slightly different configuration at their outer edges as best seen in FIGURE 6. The different configuration of the panels 18 and 18a are necessary if a fairly exacting fit is to be provided between the outer edges thereof and the sides of the panels 22 and 23. Shaping the panels 18 and 18a, substantially as shown in FIGURE 6, insures maximum coverage by the aforementioned panels and optimum protection for personnel housed and/or supplies stored in the structure 11.

The hinge members 19 are selectively mounted on opposite sides of the panels comprising the end and side walls of the structure 11. Mounting the members 19 in this manner, as best seen in FIGURES 2 and 6, enable the panels to be folded in the compact manner shown in FIGURES 1 and 3.

The panels, assembled in the above manner, may now be folded causing the structure to assume its unexpanded state. This operation is assumed to be carried out manually although it may be effected by mechanical means.

The structure 11 in the expanded state thereof (FIGURE 2) defines or embraces a large volume, while the volume defined or embraced by the structure in its unexpanded state (FIGURE 1) is relatively small. The positions of the individual panels in the unexpanded state of the structure 11 are referred to as their folded positions, their positions, at such times as the structure 11 is in its expanded state, are hereinafter referred to as their unfolded positions.

To initiate the transition of the structure 11 from the expanded to the unexpanded state thereof the central panels 16 are urged inboard with respect to the structure 11 or in other words—toward each other. Movement of the panels 16, acting through the panels 17, is transmitted to the primary panels 21 causing the latter panels to move inwardly. Simultaneously, with the movement just described, the triangular panels 18 and 18a are caused to fold (outwardly) and the secondary panels 22 and 23 to fold on each other as shown in FIGURES 5-3.

In order for the aforementioned panels to completely fold, that is—in the manner shown in FIGURES 1 and 2, it will be apparent that a panel 17 cannot exceed half (½) the length of a panel 21. In other words, the panels 16 must have a spaced relation with respect to each other, or at the end of their travel merely contact each other, if the structure 11 is to assume its unexpanded state in which the panels are completely folded as shown in FIGURE 3.

The movement just described continues until further inboard movement of the panels 21 is arrested. At this time, the secondary panels 22 and 23 of the subassembly 20, have assumed a folded and juxtaposed relation with respect to an adjacent panel 21, the side edges of the primary panels 21 have a near-contacting relation with respect to each other and the pairs of triangular panels 18 and 18a a side-by-side folded relation. In this respect it will be seen, by referring to FIGURES 1 and 3, that, in the present embodiment, the panels 18 and 18a are completely folded on themselves and their outer edges 25 extend radially of the structure 11 when the latter assumes its unexpanded state. The common hinged edges 30 of the panels 18 and 18a extend generally in an axial direction with respect to the structure 11, they are canted outboard as they approach the panels 16 and terminate at the corners of the panels 16.

With the structure 11 in its unexpanded state (FIGURE 1) it will be apparent that its overall configuration is also that of a regular prism. It will also be apparent that the unexpanded structure (FIGURE 1) has a distinct advantage in that it can be positioned in an enclosure or housing of relative small volume and frontal area as compared with the volume and frontal area of a structure required to receive the same in its expanded state (FIGURE 2). Accordingly it is possible to position the unexpanded structure in a fairly small housing, for example—the nose cone of a rocket of small diameter, resulting in minimum drag when fired through the atmosphere.

Inasmuch as the structure 11 is propelled into space in its unexpanded state, it is the manner in which it is expanded that is of particular interest in this disclosure. Although the expanding operation is the exact opposite of the contacting or folding operation previously described, it will, nevertheless, be described briefly for purposes of clarity.

Various types of apparatus adapted to expand the structure 11 may be utilized, one type of apparatus being shown in FIGURE 7.

The type shown consists of a plurality of spring-loaded hinge members 24 of rectangular cross-section. At least one spring member 24 is positioned between and secured to the panels 17 and 21 at each end of the structure 11 and assumes a compressed position at such time as the panels 17 and 21 are folded on themselves. The bite portions of the members 24 embraces the member constituting the axis of the hinge members 19 securing the panels 17 and 21 together, in this respect the members 24 are retained in position. Spring loaded members 31, incorporated in spring members 32, are positioned between the panel 16 and each of the panels 17. So mounted they cooperate with the spring members 24 in urging the structure 11 from its unexpanded to its expanded state in an obvious manner at such time as the members 24 are released.

The spring members 24 are held in their restrained position by pin members 26. The members 26 may be simultaneously moved toward or away from the panels 16 by eccentric means (not shown) actuated by shaft means (not shown) the axis of which is indicated by the numeral 27. In turn, the shaft means may be manually or remotely actuated by conventional means 28. As previously stated, the actuation means 28 of the type shown herein constitutes only one of a number that may be utilized for this purpose and constitutes no part of the present invention.

At such time as the springs 24 are no longer restrained, the force of the springs pivot the panels 17 about their common hinge lines with respect to the associated panels 21. It will now be apparent that, as the panels 17 pivot inboard of the structure 11 the panels 21 are caused to move in an outward direction. The panels 18, 18a, 22 and 23 sequentially unfold in the manner and order shown in FIGURES 4, 5 and 6. The panels 16, 17, 18 and 18a, constituting one end of the structure 11, are caused to assume a substantially coplanar relation, and the panels 22 and 23 to assume an aligned relation providing the continuous side wall 14 of the structure 11.

It will be seen by referring to FIGURE 2 that the outer end edges of the panels 17 have a full contacting relation with respect to the side surfaces of the panels 21 at such times as the panels are completely unfolded. This feature insures that the panels comprising the respective ends of the structure 11 have a coplanar relation when completely unfolded.

Inasmuch as the structure 11 in its expanded state is designed to house personnel and/or supplies, an opening 31 providing ingress and egress from and to the structure is provided in at least one of the panels 16. The opening 31 is covered by suitable structure 35 which may constitute a conventional airlock if the structure 11 is to be rendered fluid tight.

It will be seen that a minimum of relatively simple actuators are required to effect the expansion of the structure 11. Accordingly the possibility of actuator failure is practically eliminated. The unfolding operation—for the most part—is due to the pivotal action occurring between the panels comprising the structure 11.

Thus it is seen an expandable structure providing the many objects of the invention is disclosed. While in order to comply with the statute, the invention has been described in language more or less specific as to structural features, it is to be understood that the invention is not limited to the specific features shown, but that the method and means herein disclosed comprise several forms of putting the invention into effect, and the invention is therefore claimed in any of its forms or modifications falling within the legitimate and valid scope of the appended claims.

We claim:

1. In an elongated structure of prismatic configuration constructed of rigid panels and including a side and a pair of end walls and having expanded and unexpanded positions, the combination comprising: each of said end walls including a polygon shaped panel and a plurality of first elongated panels; an end edge of each of said first panels being pivotally secured to the edges of said polygon panels whereby said first panels extend radially from the polygon panels; a plurality of second elongated panels; and the end edges of said second panels being pivotally secured to the free end edges of said first panels to provide a partial structure in which the polygon panels have a spaced relation at such times as said structure is caused to assume its unexpanded position and said polygon and first panels have a substantially coplanar relation at such time as said structure is caused to assume its expanded position.

2. In an elongated structure as set forth in claim 1: in which each of said end walls include a plurality of pairs of triangularly shaped panels having first and second corresponding edges; first corresponding edges of each pair of said triangular panels being hinged together for relative angular movement; a pair of said triangular panels being positioned between each of said first panels with said second corresponding edges having a contacting and abutting relation with respect to longitudinal edges of said first panels between which they are located at such time as said structure is in said expanded position; and said second edges of said triangular panels being pivotally attached to the longitudinal edges of said first panels with which they have an abutting and contacting relation.

3. In an elongated structure of prismatic configuration fabricated of rigid panels including a side and a pair of end walls and having expanded and unexpanded positions, the combination comprising: each of the end walls including a polygon shaped panel and a plurality of first panels of rectangular configuration; an end edge of said first panels being pivotally secured to an edge of each of said polygon panels whereby said first panels extend radially with respect to said polygon panels; a plurality of second panels of rectangular configuration the individual lengths of which is at least twice the individual lengths of said first panels; an end edge of said second panels being pivotally secured to the free end edges of said first panels to provide a partial structure in which the polygon panels have a spaced relation at such times as said partial structure is caused to assume its unexpanded position and said polygon and first panels comprising one end of said structure have a substantially coplanar relation at such times as said structure is caused to assume its expanded position.

4. In an elongated structure as set forth in claim 3: in which each of said end walls include a plurality of pairs of triangularly shaped panels having first and second corresponding edges; first corresponding edges of each pair of said triangular panels being hinged together for relative angular movement; a pair of said triangular panels being positioned between each of said first panels with said second corresponding edges having a contacting and abutting relation with respect to longitudinal edges of said first panels between which they are located at such time as said structure is in said expanded position; and said second edges of said triangular panels being pivotally attached to the longitudinal edges of said first panels with which they have an abutting and contacting relation.

5. In an elongated structure as set forth in Claim 4: including a plurality of sets of third panels of rectangular configuration; one set of said third panels being positioned between adjacent second panels with certain of their side edges in contacting and abutting relationship and their outer edges in contacting and abutting relation with respect to said second panels at such times as said structure assumes said expanded position; hinge means securing said certain edges together and the contacting edges of each of said set of third panels to said contacting edges of said second panels whereby each set of said third panels assumes a side-by-side folded relation on one of said second panels at such times as said structure assumes said unexpanded position.

6. An elongated structure of prismatic configuration constructed of rigid panels and including a side and a pair of end walls and having expanded and unexpanded positions, the combination comprising: each of said end walls including a polygon shaped panel and a plurality of first elongated panels; an end edge of each of said first panels being pivotally secured to the edges of said polygon panels whereby said first panels extend radially from the polygon panels; a plurality of second elongated panels; and the end edges of said second panels being pivotally secured to the free end edges of said first panels to provide a partial structure in which the polygon panels have a spaced relation at such times as said structure is caused to assume its unexpanded position and said polygon and first panels have a substantially coplanar relation at such time as said structure is caused to assume its expanded position; and means adapted to urge said structure from said unexpanded to said expanded position.

7. An elongated structure of prismatic configuration fabricated of rigid panels including a side and a pair of end walls and having expanded and unexpanded positions comprising: each of the end walls including a polygon shaped panel and a plurality of first panels of rectangular configuration; an end edge of said first panels being pivotally secured to each edge of each of said polygon panels whereby said first panels extend radially with respect to said polygon panels; a plurality of second panels of rectangular configuration the individual lengths of which is at least twice the individual lengths of said first panels; the end edges of said second panels being pivotally secured to the free end edges of said first panels to provide a partial structure in which the polygon panels have a spaced relation at such times as said partial structure assumes its unexpanded position and said polygon and said first panels comprising one end of said structure have substantially a coplanar relation at such times as said structure assumes its expanded position; and means adapted to urge said structure from said unexpanded to said expanded position.

8. An elongated structure as set forth in claim 6: in which each of said end walls include a plurality of pairs of triangularly shaped panels having first and second corresponding edges; first corresponding edges of each pair of said triangular panels being hinged together for relative angular movement; a pair of said triangular panels being positioned between each of said first panels with said second corresponding edges having a contacting and abutting relation with respect to longitudinal edges of said first panels between which they are located at such time as said structure is in said expanded position; and said second edges of said triangular panels being pivotally attached to the longitudinal edges of said first panels with which they have an abutting and contacting relation.

9. An elongated structure as set forth in claim 7: including a plurality of sets of third panels of rectangular configuration; one set of said third panels being positioned between adjacent second panels with certain of their side edges in contacting and abutting relationship and their outer edges in contacting and abutting relation with respect to said second panels at such times as said structure assumes said expanded position; hinge means securing said certain edges together and the contacting edges of each of said set of third panels to said contacting edges of said second panels whereby each set of said third panels assumes a side-by-side folded relation on one of said second panels at such times as said structure assumes said unexpanded position.

References Cited by the Examiner

UNITED STATES PATENTS

| | | | |
|---|---|---|---|
| 2,440,449 | 4/48 | Reamer | 52—82 |
| 2,485,914 | 10/49 | Owens | 52—70 |
| 2,896,224 | 7/59 | Landry | 220—6 |

RICHARD W. COOKE, Jr., *Primary Examiner.*

HARRISON R. MOSELEY, BENJAMIN A. BORCHELT, *Examiners.*